(12) United States Patent
Crabtree et al.

(10) Patent No.: US 10,860,962 B2
(45) Date of Patent: Dec. 8, 2020

(54) SYSTEM FOR FULLY INTEGRATED CAPTURE, AND ANALYSIS OF BUSINESS INFORMATION RESULTING IN PREDICTIVE DECISION MAKING AND SIMULATION

(71) Applicant: QOMPLX, Inc., Tysons, VA (US)

(72) Inventors: Jason Crabtree, Vienna, VA (US); Andrew Sellers, Colorado Springs, CO (US)

(73) Assignee: QOMPLX, INC., Tysons, VA (US)

( * ) Notice: Subject to any disclaimer, the term of this patent is extended or adjusted under 35 U.S.C. 154(b) by 888 days.

(21) Appl. No.: 15/141,752

(22) Filed: Apr. 28, 2016

(65) Prior Publication Data

US 2017/0124481 A1     May 4, 2017

Related U.S. Application Data

(63) Continuation-in-part of application No. 14/925,974, filed on Oct. 28, 2015, and a continuation-in-part of application No. 14/986,536, filed on Dec. 31, 2015, now Pat. No. 10,210,255, and a continuation-in-part of application No. 15/091,563, filed on Apr. 5, 2016, now Pat. No. 10,204,147.

(51) Int. Cl.
    *G06Q 10/06*     (2012.01)
(52) U.S. Cl.
    CPC ................. *G06Q 10/0637* (2013.01)
(58) Field of Classification Search
    None
    See application file for complete search history.

(56) References Cited

U.S. PATENT DOCUMENTS

| | | | |
|---|---|---|---|
| 7,171,515 B2 | 1/2007 | Ohta et al. | |
| 7,227,948 B2* | 6/2007 | Ohkuma | H04L 9/0625 380/37 |
| 8,346,753 B2* | 1/2013 | Hayes | G06F 16/951 707/709 |
| 2010/0205588 A1* | 8/2010 | Yu | G06F 9/52 717/149 |
| 2012/0303396 A1* | 11/2012 | Winkler | G06Q 10/00 705/7.11 |
| 2014/0149186 A1* | 5/2014 | Flaxer | G06Q 10/0637 705/7.36 |
| 2014/0359552 A1* | 12/2014 | Misra | H04L 67/12 717/100 |
| 2016/0006629 A1* | 1/2016 | Ianakiev | G06F 21/32 709/224 |

* cited by examiner

*Primary Examiner* — Tracy C. Chan
(74) *Attorney, Agent, or Firm* — Brian R. Galvin; Brian S. Boon; Galvin Patent Law LLC

(57) ABSTRACT

A system for fully integrated collection of business impacting data, analysis of that data and generation of both analysis driven business decisions and analysis driven simulations of alternate candidate business action comprising a business data retrieval engine stored in a memory of and operating on a processor of a computing device, a business data analysis engine stored in a memory of and operating on a processor of a computing device and a business decision and business action path simulation engine stored in a memory of and operating on a processor of one of more computing devices has been developed.

14 Claims, 18 Drawing Sheets

```
import scrapy
from scrapy.spiders import CrawlSpider, Rule
from scrapy.linkextractors import LinkExtractor
                                                            } ~1010 class MySpider(CrawlSpider):
    name = 'example.com'
    allowed_domains = ['example.com']
    start_urls = ['http://www.example.com']
                                                            } ~1020
                                                                                    1030
    rules = (
        # Extract links matching 'category.php' (but not matching 'subsection.php')
        # and follow links from them (since no callback means follow=True by default).
        Rule(LinkExtractor(allow=('category\.php', ), deny=('subsection\.php', ))),
        # Extract links matching 'item.php' and parse them with the spider's method parse_item
        Rule(LinkExtractor(allow=('item\.php', )), callback='parse_item'),
    )

def parse_item(self, response):
        self.logger.info('Hi, this is an item page! %s', response.url)
        item = scrapy.Item()
        item['id'] = response.xpath('//td[@id="item_id"]/text()').re(r'ID: (\d+)')
        item['name'] = response.xpath('//td[@id="item_name"]/text()').extract()
        item['description'] = response.xpath('//td[@id="item_description"]/text()').extract()
        return item
                                                                                    1040
```

Fig. 10

SYSTEM FOR FULLY INTEGRATED CAPTURE, AND ANALYSIS OF BUSINESS INFORMATION RESULTING IN PREDICTIVE DECISION MAKING AND SIMULATION

CROSS-REFERENCE TO RELATED APPLICATIONS

This application is a continuation-in-part of U.S. patent application Ser. No. 14/925,974, titled "RAPID PREDICTIVE ANALYSIS OF VERY LARGE DATA SETS USING THE DISTRIBUTED COMPUTATIONAL GRAPH" and filed on Oct. 28, 2015, and is also a continuation-in-part of U.S. patent application Ser. No. 14/986,536, titled "DISTRIBUTED SYSTEM FOR LARGE VOLUME DEEP WEB DATA EXTRACTION", and filed on Dec. 31, 2015, and is also a continuation-in-part of U.S. patent application Ser. No. 15/091,563, titled "SYSTEM FOR CAPTURE, ANALYSIS AND STORAGE OF TIME SERIES DATA FROM SENSORS WITH HETEROGENEOUS REPORT INTERVAL PROFILES", and filed on Apr. 5, 2016, the entire specification of each of which is incorporated herein by reference in its entirety.

BACKGROUND OF THE INVENTION

Field of the Invention

The present invention is in the field of use of computer systems in business information management, operations and predictive planning. Specifically, the development of a system that integrates the functions of business information and operating data, complex data analysis and use of that data, preprogrammed commands and parameters and machine learning to create a business operating system capable of predictive decision making and action path outcome simulation.

Discussion of the State of the Art

Over the past decade the amount of financial, operational, infrastructure, risk management and philosophical information available to decision makers of a business from such sources as ubiquitous sensors found on a business's equipment or available from third party sources, detailed cause and effect data, and business process monitoring software has expanded to the point where the data has overwhelmed the abilities of virtually anyone to follow all of it much less interpret and make meaningful use of that available data in a given business environment. In other words the torrent of business related information now available to a decision maker of group of decision makers has far out grown the ability of those in most need of its use to either fully follow it or reliably use it. Failure to recognize important trends or become aware of information in a timely fashion has led to highly visible, customer facing, outages at NETFLIX™, FACEBOOK™, and UPS™ over the past few years, just to list a few.

There have several been developments in business software that have arisen with the purpose of streamlining or automating either business data analysis or business decision process. PALANTIR™ offers software to isolate patterns in large volumes of data, DATABRICKS™ offers custom analytics services ANAPLAN™ offers financial impact calculation services and there are other software sources that mitigate some aspect of business data relevancy identification, analysis of that data and business decision automation, but none of these solutions handle more than a single aspect of the whole task.

What is needed is a fully integrated system that retrieves business relevant information from many diverse sources, identifies and analyzes that high volume data, transforming it to a business useful format and then uses that data to create intelligent predictive business decisions and business pathway simulations. Forming a "business operating system."

SUMMARY OF THE INVENTION

Accordingly, the inventor has developed a distributed system for the fully integrated retrieval, and deep analysis of business operational information from a plurality of sources. The system further uses results of business information analytics to optimize the making of business decisions and allow for alternate action pathways to be simulated using the latest data and machine mediated prediction algorithms.

According to a preferred embodiment of the invention, a system for comprising: a business data retrieval engine stored in a memory of and operating on a processor of a computing device, a business data analysis engine stored in a memory of and operating on a processor of a computing device and a business decision and business action path simulation engine stored in a memory of and operating on a processor of one of more computing devices. Wherein, the business information retrieval engine: retrieves a plurality of business related data from a plurality of sources, accepts a plurality of analysis parameters and control commands directly from human interface devices or from one or more command and control storage devices, and stores accumulated retrieved information for processing by data analysis engine or predetermined data timeout. The business information analysis engine: retrieves a plurality of data types from the business information retrieval engine, performs a plurality of analytical functions and transformations on retrieved data based upon the specific goals and needs set forth in a current campaign by business process analysis authors. Wherein the business decision and business action path simulation engine: employs results of data analyses and transformations performed by the business information analysis engine, together with available supplemental data from a plurality of sources as well as any current campaign specific machine learning, commands and parameters from business process analysis authors to formulate current business operations and risk status reports and employs results of data analyses and transformations performed by the business information analysis engine, together with available supplemental data from a plurality of sources, any current campaign specific commands and parameters from business process analysis authors, as well as input gleaned from machine learning algorithms to deliver business action pathway simulations and business decision support to a first end user.

According to another embodiment of the invention, the system's business information retrieval engine is stored in the memory of and operating on a processor of a computing device, employs a portal for human interface device input at least a portion of which are business related data and at least another portion of which are commands and parameters related to the conduct of a current business analysis campaign. The business information retrieval engine employs a high throughput deep web scraper stored in the memory of an operating on a processor of a computing device, which receives at least some spider configuration parameters from the highly customizable cloud based interface, coordinates one or more world wide web searches (scrapes) using both general search control parameters and individual web search agent (spider) specific configuration data, receives scrape progress feedback information which may lead to issuance of further web search control parameters, controls and monitors the spiders on distributed scrape servers, receives the raw scrape campaign data from scrape servers, aggregates at least portions of scrape campaign data from each web site or web page traversed as per the parameters of the scrape campaign. The archetype spiders are provided by a program library and individual spiders are created using configuration files. Scrape campaign requests are persistently stored and can be reused or used as the basis for similar scrape campaigns. The business information retrieval engine employs a multidimensional time series data store stored in a memory of and operating on a processor of a computing device to receive a plurality of data from a plurality of sensors of heterogeneous types, some of which may have heterogeneous reporting and data payload transmission profiles, aggregates the sensor data over a predetermined amount of time, a predetermined quantity of data or a predetermined number of events, retrieves a specific quantity of aggregated sensor data per each access connection predetermined to allow reliable receipt and inclusion of the data, transparently retrieves quantities of aggregated sensor data too large to be reliably transferred by one access connection using a further plurality access connections to allow capture of all aggregated sensor data under conditions of heavy sensor data influx and stores aggregated sensor data in a simple key-value pair with very little or no data transformation from how the aggregated sensor data is received. Last, the business data analysis engine employs a directed computational graph stored in the memory of an operating system on a processor of a computing device which, retrieves streams of input from one or more of a plurality of data sources, filters data to remove data records from the stream for a plurality of reasons drawn from, but not limited to a set comprising absence of all information, damage to data in the record, and presence of in-congruent information or missing information which invalidates the data record, splits filtered data stream into two or more identical parts, formats data within one data stream based upon a set of predetermined parameters so as to prepare for meaningful storage in a data store, sends identical data stream further analysis and either linear transformation or branching transformation using resources of the system.

According to another embodiment of the invention, a method for fully integrated capture, and transformative analysis of business impactful information resulting in predictive decision making and simulation the method comprising the steps of: (a) retrieving business related data and analysis campaign command and control information using a business information retrieval engine stored in the memory of an operating on a processor of a computing device; (b) analyzing and transforming retrieved business related data using a business information analysis engine stored in the memory of an operating on a processor of a computing device in conjunction with previously designed analysis campaign command and control information; and (c) presenting business decision critical information as well as business action pathway simulation information using a business decision and business action path simulation engine based upon the results of analysis of previously retrieved business related data and previously entered analysis campaign command and control information.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 10 is a listing of a very simple example Scrapy web spider configuration file.

DETAILED DESCRIPTION

Figure 1:
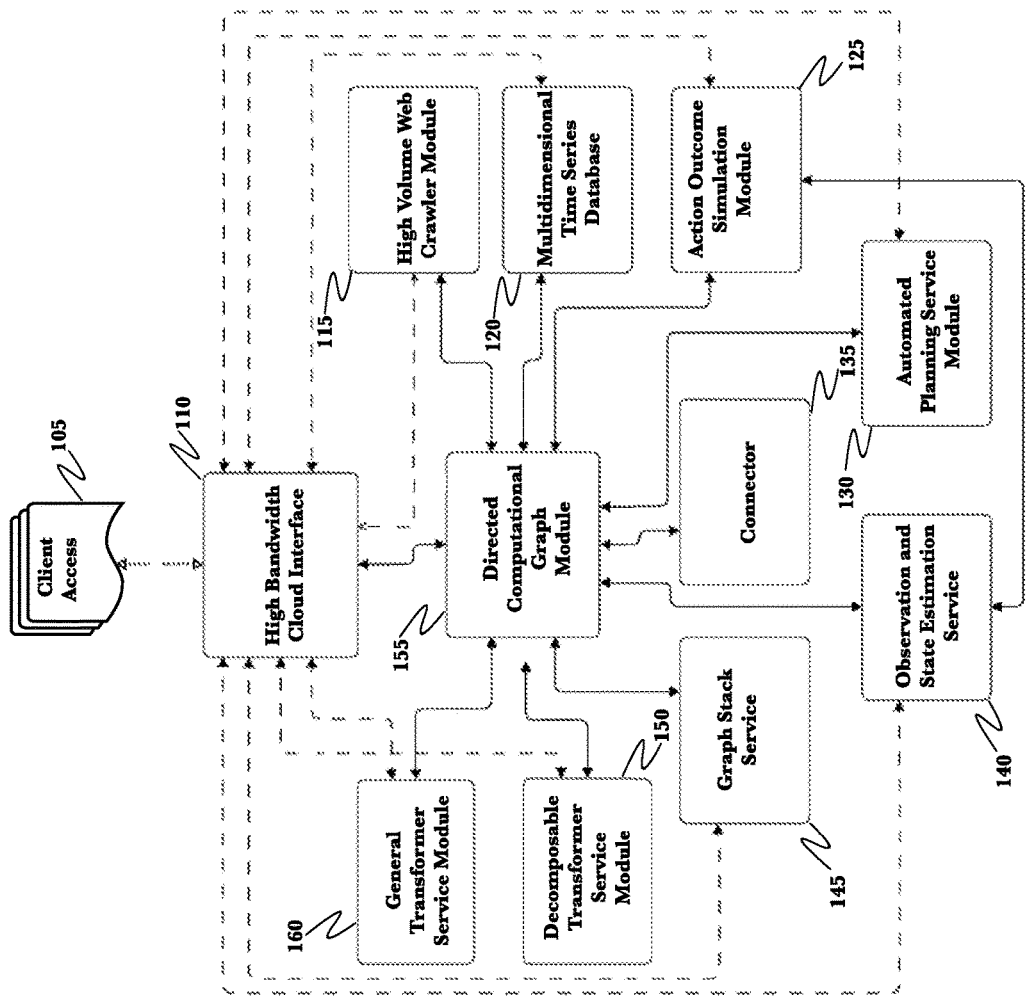
FIG. 1 is a diagram of an exemplary architecture of a business operating system according to an embodiment of the invention.

The inventor has conceived, and reduced to practice, a system and method for fully integrated capture and analysis of business information resulting in predictive decision making and simulation.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

As used herein, a "swimlane" is a communication channel between a time series sensor data reception and apportioning device and a data store meant to hold the apportioned data time series sensor data. A swimlane is able to move a specific, finite amount of data between the two devices. For example a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a business operating system 100 according to an embodiment of the invention. Client access to the system 105 both for system control and for interaction with system output such as automated predictive decision making and planning and alternate pathway simulations, occurs through the system's highly distributed, very high bandwidth cloud interface 110 which is application driven through the use of the Scala/Lift development environment and web interaction operation mediated by AWS ELASTIC BEANSTALK™, both used for standards compliance and ease of development. Much of the business data analyzed by the system both from sources within the confines of the client business, and from cloud based sources, also enter the system through the cloud interface 110, data being passed to the analysis and transformation components of the system, the directed computational graph module 155, high volume web crawling module 115 and multidimensional time series database 120. The directed computational graph retrieves one or more streams of data from a plurality of sources, which includes, but is in no way not limited to, a number of physical sensors, web based questionnaires and surveys, monitoring of electronic infrastructure, crowd sourcing campaigns, and human input device information. Within the directed computational graph, data may be split into two identical streams, wherein one sub-stream may be sent for batch processing and storage while the other sub-stream may be reformatted for transformation pipeline analysis. The data is then transferred to general transformer service 160 for linear data transformation as part of analysis or decomposable transformer service 150 for branching or iterative transformations that are part of analysis. The directed computational graph 155 represents all data as directed graphs where the transformations are nodes and the result messages between transformations edges of the graph. These graphs which contain considerable intermediate transformation data are stored and further analyzed within graph stack module 145. High volume web crawling module 115 uses multiple server hosted preprogrammed web spiders to find and retrieve data of interest from web based sources that are not well tagged by conventional web crawling technology. Multiple dimension time series database module 120 receives data from a large plurality of sensors that may be of several different types. The module is designed to accommodate irregular and high volume surges by dynamically allotting network bandwidth and server processing channels to process the incoming data. Data retrieved by the multidimensional time series database 120 and the high volume web crawling module 115 may be further analyzed and transformed into task optimized results by the directed computational graph 155 and associated general transformer service 150 and decomposable transformer service 160 modules.

Results of the transformative analysis process may then be combined with further client directives, additional business rules and practices relevant to the analysis and situational information external to the already available data in the automated planning service module 130 which also runs powerful predictive statistics functions and machine learning algorithms to allow future trends and outcomes to be rapidly forecast based upon the current system derived results and choosing each a plurality of possible business decisions. Using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the business outcome simulation module 125 coupled with the end user facing observation and state estimation service 140 allows business decision makers to investigate the probable outcomes of choosing one pending course of action over another based upon analysis of the current available data. For example, the pipelines operations department has reported a very small reduction in crude oil pressure in a section of pipeline in a highly remote section of territory. Many believe the issue is entirely due to a fouled, possibly failing flow sensor, others believe that it is a proximal upstream pump that may have foreign material stuck in it. Correction of both of these possibilities is to increase the output of the effected pump to hopefully clean out it or the fouled sensor. A failing sensor will have to be replaced at the next maintenance cycle. A few, however, feel that the pressure drop is due to a break in the pipeline, probably small at this point, but even so, crude oil is leaking and the remedy for the fouled sensor or pump option could make the leak much worse and waste much time afterwards. The company does have a contractor about 8 hours away, or could rent satellite time to look but both of those are expensive for a probable sensor issue, significantly less than cleaning up an oil spill though and then with significant negative public exposure. These sensor issues have happened before and the business operating system 100 has data from them, which no one really studied due to the great volume of columnar figures, so the alternative courses 125, 140 of action are run. The system, based on all available data predicts that the fouled sensor or pump are unlikely the root cause this time due to other available data and the contractor is dispatched. She finds a small breach in the pipeline. There will be a small cleanup and the pipeline needs to be shutdown for repair but multiple tens of millions of dollars have been saved. This is just one example of a great many of the possible use of the business operating system, those knowledgeable in the art will easily formulate more.

Figure 2:
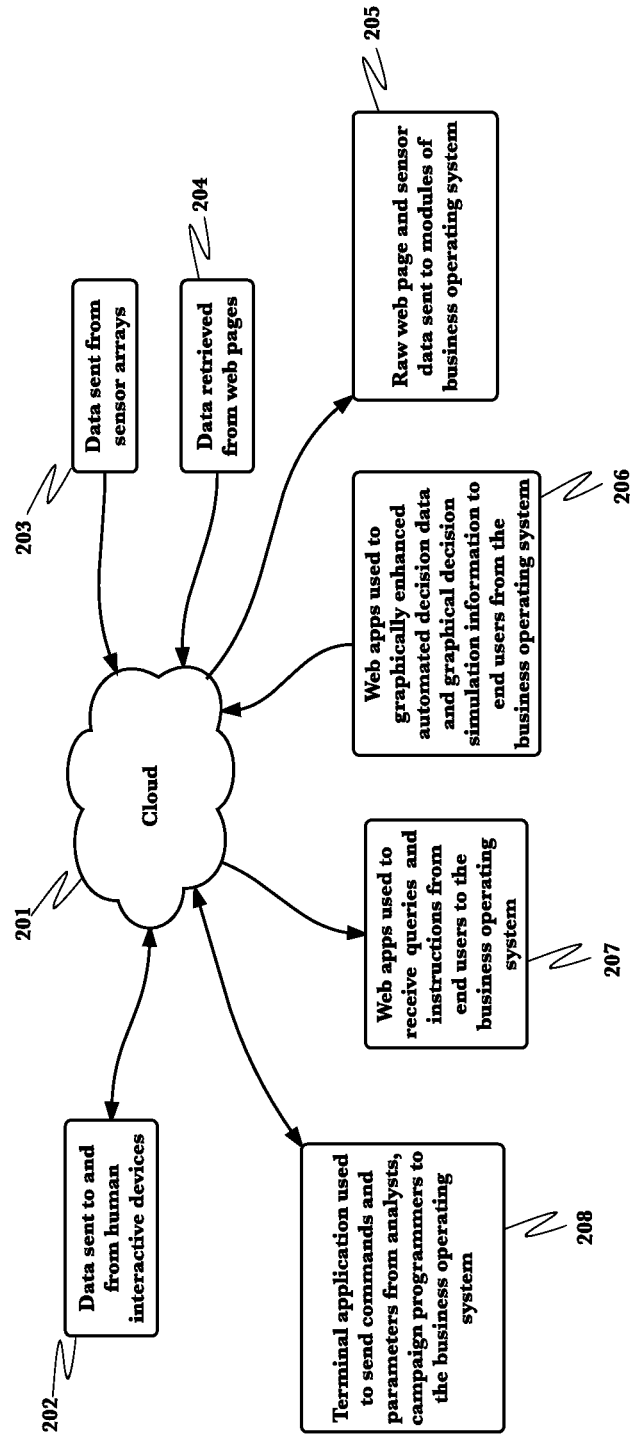
FIG. 2 is a process flow diagram showing an exemplary set of steps used in the function of the very high bandwidth cloud interface.

FIG. 2 is a process flow diagram showing an exemplary set of steps used in the function of the very high bandwidth cloud interface 200, also depicted in FIG. 1, 110. Data flowing into and out of the very high bandwidth cloud interface 200 may come from human interactions through desktop or mobile computing devices 202, reading data sent from remote sensor arrays 203 and data retrieved from web pages 204 both of which 203, 204 may reach a very high instantaneous volume for moderate time intervals which must be accommodated by the interface to assure reliable data capture. It should be noted that while the cloud 201 may usually mean the internet, often the World Wide Web in the current context, it also extends here to data transmitted from the confines of the client business to the business operating system which may use a separate network topology. Within the very high bandwidth cloud interface, web apps, constructed and supported using mostly open source resources, present graphical interfaces for end users to both submit new information 207 and to visualize the results of analyses and predictive decisions as well as simulations created by the business operating system 208. Programming is also used to accept and properly route command line directives and parameters from analysts and programmers to the system as analyses are carried out 208. Sensor data and raw webpage data being retrieved by the multiple dimension time series database module, depicted in 120, and high volume web crawling module depicted in 115, also may pass through the high volume interface 205. While this embodiment represents the cloud interface as a monolithic portion of the business operating system architecture, the invention has no such requirement and thus in other embodiments, data, programming command and campaign parameters may enter the system from multiple portal to the cloud.

Figure 3:
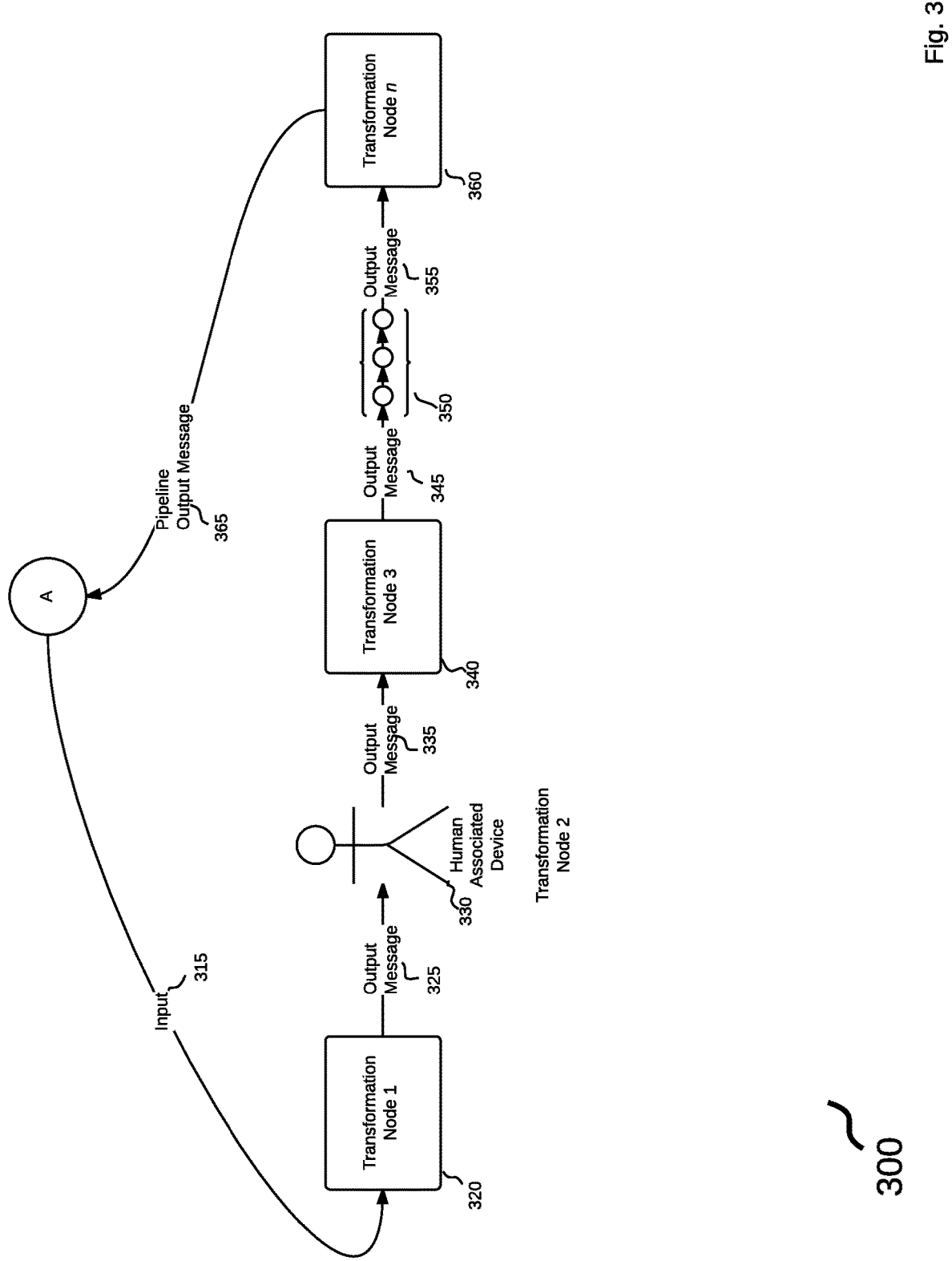
FIG. 3 is a diagram of an exemplary architecture for a linear transformation pipeline system which introduces the concept of the transformation pipeline as a directed graph of transformation nodes and messages according to an embodiment of the invention.

FIG. 3 is a block diagram of a preferred architecture for a transformation pipeline within a system for predictive analysis of very large data sets using distributed computational graph 300. According to the embodiment, streaming input 315 serves as input to the first transformation node 320 of the transformation pipeline. Transformation node's function is performed on input data stream and transformed output message 325 is sent to transformation node 2 330. The progression of transformation nodes 320, 330, 340, 350, 360 and associated output messages from each node 325, 335, 345, 355 is linear in configuration this is the simplest arrangement and, as previously noted, represents the current state of the art. While transformation nodes are described according to various embodiments as uniform shape, such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve human interaction through a program running on a desktop or mobile device 330, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent function of another transformation pipeline. It should be appreciated that the node length of transformation pipelines depicted in no way confines the transformation pipelines employed by the invention to an arbitrary maximum length 340, 350, 360 as, being distributed, the number of transformations would be limited by the resources made available to each implementation of the invention. It should be further appreciated that there need be no limits on transform pipeline length. Output of the last transformation node and by extension, the transform pipeline 360 may be sent back to messaging software module 135 for predetermined action.

Figure 4:
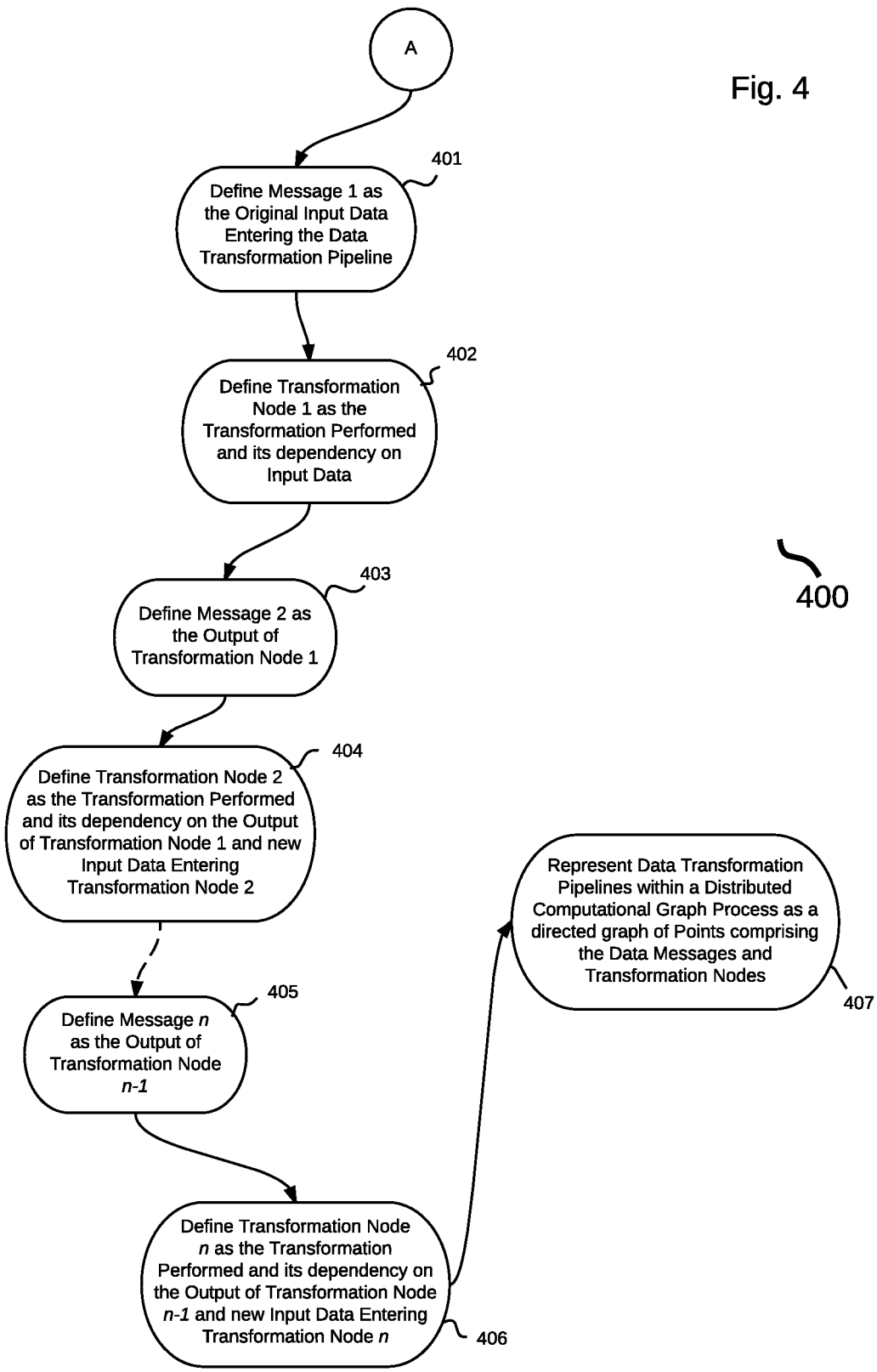
FIG. 4 is a process flow diagram of a method for an embodiment of modeling the transformation pipeline module of the invention as a directed graph using graph theory.

FIG. 4 is a process flow diagram of a method 400 for an embodiment of modeling the transformation pipeline module 160 of the invention as a directed graph using graph theory 155. According to the embodiment, the individual transformations 402, 404, 406 of the transformation pipeline $t_1 \ldots t_n$ such that each $t_i$ T are represented as graph nodes. Transformations belonging to T are discrete transformations over individual datasets $d_i$, consistent with classical functions. As such, each individual transformation $t_j$, receives a set of inputs and produces a single output. The input of an individual transformation $t_i$, is defined with the function in: $t_i\ d_1 \ldots d_k$ such that $in(t_i)=\{d_1 \ldots d_k\}$ and describes a transformation with k inputs. Similarly, the output of an individual transformation is defined as the function out: $t_j$ [$1d_1$] to describe transformations that produce a single output (usable by other transformations). A dependency function can now be defined such that $dep(t_a,t_b)$ $out(t_a) in(t_b)$ The messages carrying the data stream through the transformation pipeline 401, 403, 405 make up the graph edges. Using the above definitions, then, a transformation pipeline within the invention can be defined as G=(V,E) where $message(t_1, t_2 \ldots t_n)$V and all transformations $t_1 \ldots t_n$ and all dependencies $dep(t_i,t_j)$E 407.

Figure 5:
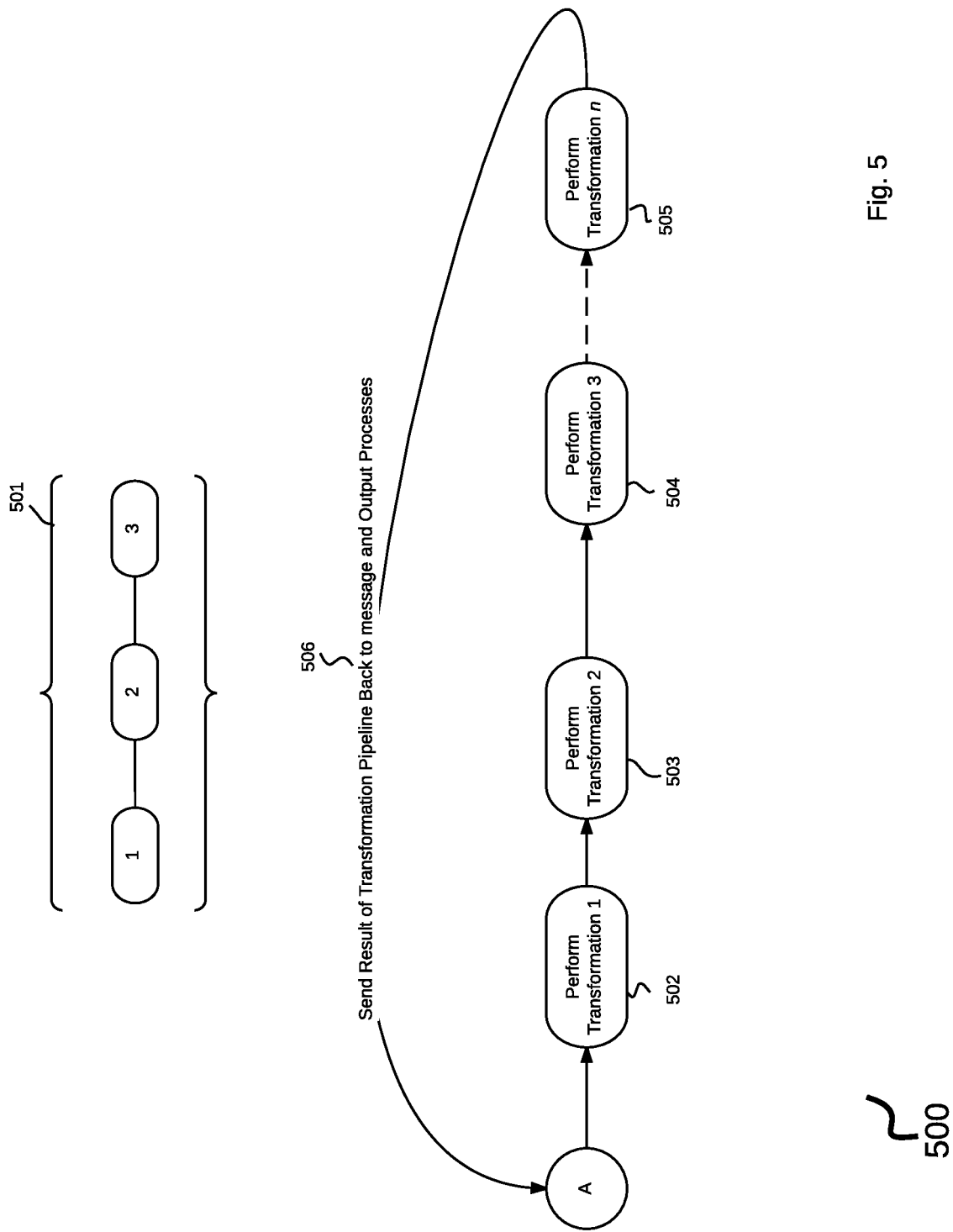
FIG. 5 is a process flow diagram of a method for one embodiment of a linear transformation pipeline.

FIG. 5 is a process flow diagram of a method 500 for one embodiment of a linear transformation pipeline 501. This is the simplest of configurations as the input stream is acted upon by the first transformation node 502 and the remainder of the transformations within the pipeline are then performed sequentially 502, 503, 504, 505 for the entire pipeline with no introduction of new data internal to the initial node or splitting output stream prior to last node of the pipeline 505. This configuration is the current state of the art for transformation pipelines and is the most general form of these constructs. Linear transformation pipelines require no special manipulation to simplify the data pathway and are thus referred to as non-decomposable they are therefore processed by the general transformer service 160. The example depicted in this diagram was chosen to convey the configuration of a linear transformation pipeline and is the simplest form of the configuration felt to show the point. It in no way implies limitation of the invention.

Figure 6:
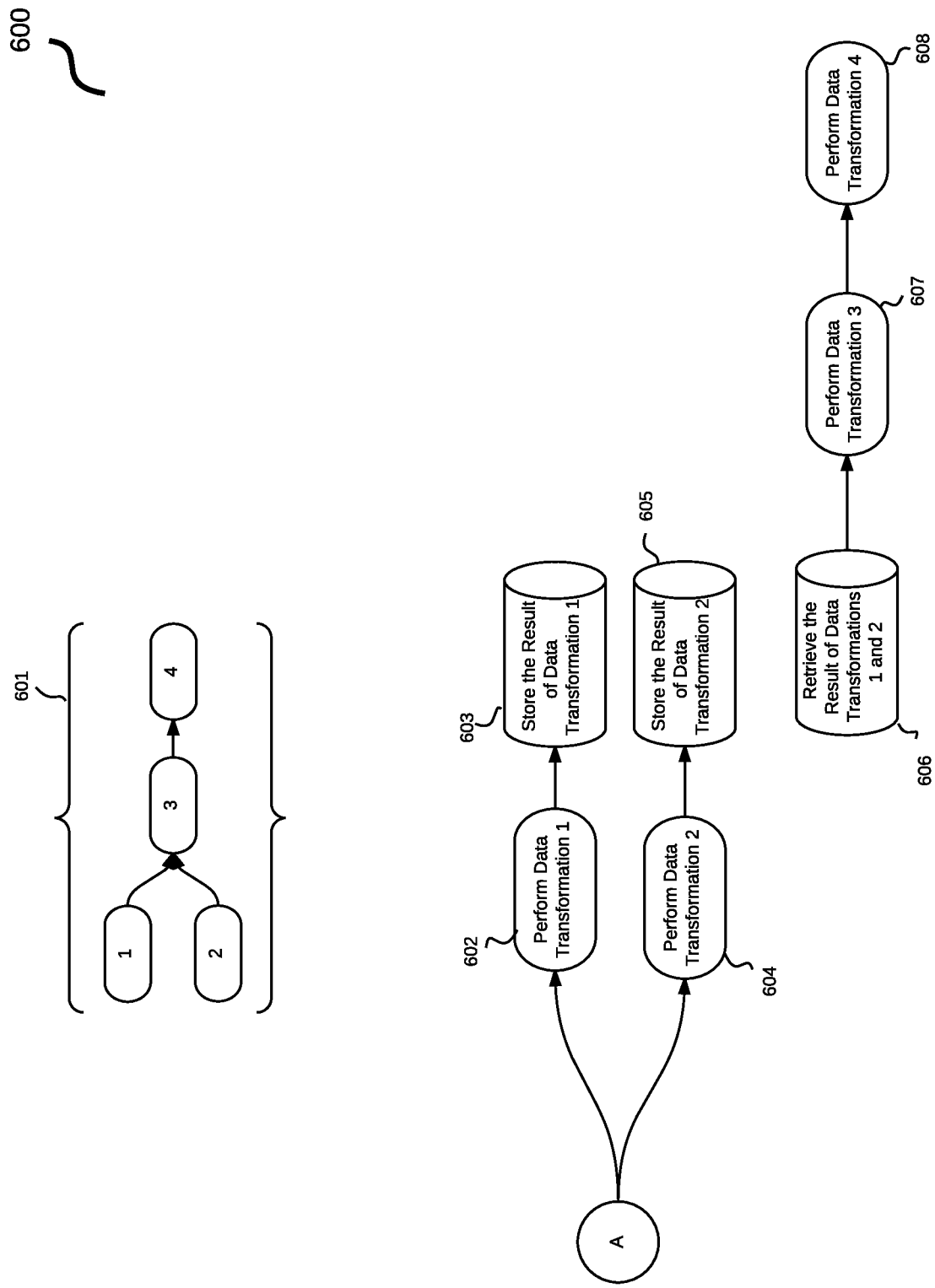
FIG. 6 is a process flow diagram of a method for one embodiment of a transformation pipeline where one transformation node in a transformation pipeline receives data streams from two source transformation nodes.

FIG. 6 is a process flow diagram of a method 600 for one embodiment of a transformation pipeline where one transformation node 607 in a transformation pipeline receives data streams from two source transformation nodes 601. The invention handles this transformation pipeline configuration by decomposing or serializing the input events 602-603, 604-605 heavily relying on post transformation function continuation. The results of individual transformation nodes 602, 604 just antecedent to the destination transformation node 606 and placed into a single specialized data storage transformation node 603, 605 (shown twice as process occurs twice). To process this transformation pipeline the pipeline must be taken apart and is handled by the decomposable transformer service 150. The combined results then retrieved from the data store 606 and serve as the input stream for the transformation node within the transformation pipeline backbone 607, 608. The example depicted in this diagram was chosen to convey the configuration of transformation pipelines with individual transformation nodes that receive input from two source nodes 602, 604 and is the simplest form of the configuration felt to show the point. It in no way implies limitation of the invention. One knowledgeable in the art will realize the great number of permutations and topologies possible, especially as the invention places no design restrictions on the number of transformation nodes receiving input from greater than one sources or the number sources providing input to a destination node.

Figure 7:
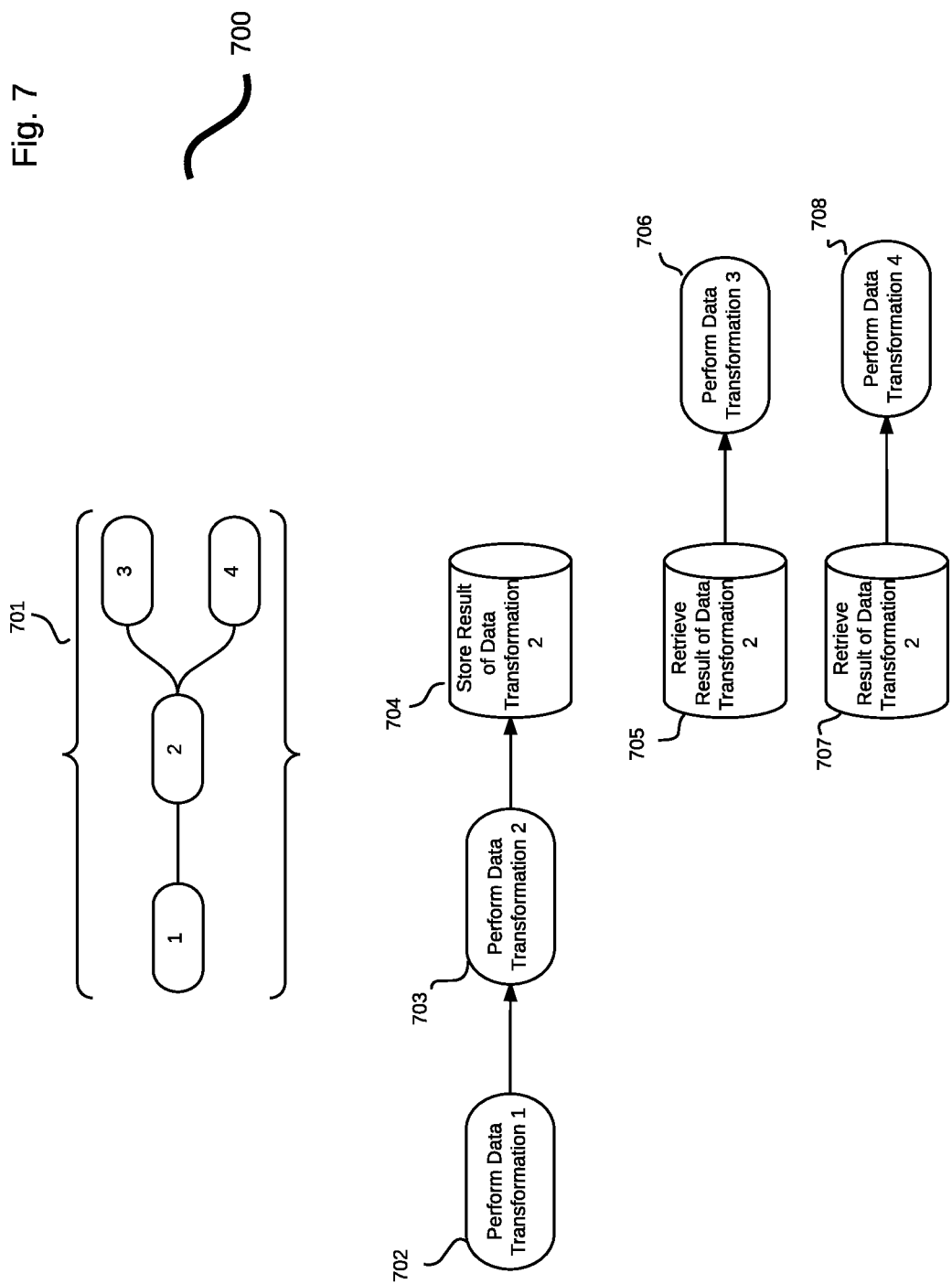
FIG. 7 is a process flow diagram of a method for one embodiment of a transformation pipeline where one transformation node in a transformation pipeline sends output data stream to two destination transformation nodes in potentially two separate transformation pipelines.

FIG. 7 is a process flow diagram of a method 700 for one embodiment of a transformation pipeline where one transformation node 703 in a transformation pipeline sends output data stream to two destination transformation nodes 701, 706, 708 in potentially two separate transformation pipelines. The invention handles this transformation pipeline configuration by decomposing or serializing the output events 704,705-706, 707-708. The results of the source transformation node 703 just antecedent to the destination transformation nodes 706 and placed into a single specialized data storage transformation node 704, 705, 707 (shown three times as storage occurs and retrieval occurs twice). The results of the antecedent transformation node may then be retrieved from a data store 704 and serves as the input stream for the transformation nodes two downstream transformation pipeline 706, 708. The example depicted in this diagram was chosen to convey the configuration of transformation pipelines with individual transformation nodes that send output streams to two destination nodes 706, 708 and is the simplest form of the configuration felt to show the point. It in no way implies limitation of the invention. One knowledgeable in the art will realize the great number of permutations and topologies possible, especially as the invention places no design restrictions on the number of transformation nodes sending output to greater than one destination or the number destinations receiving input from a source node. This example transformation pipeline is also complex and must be disassembled to process fully, it would therefore also be processed by the decomposable transformation server 150.

Figure 8:
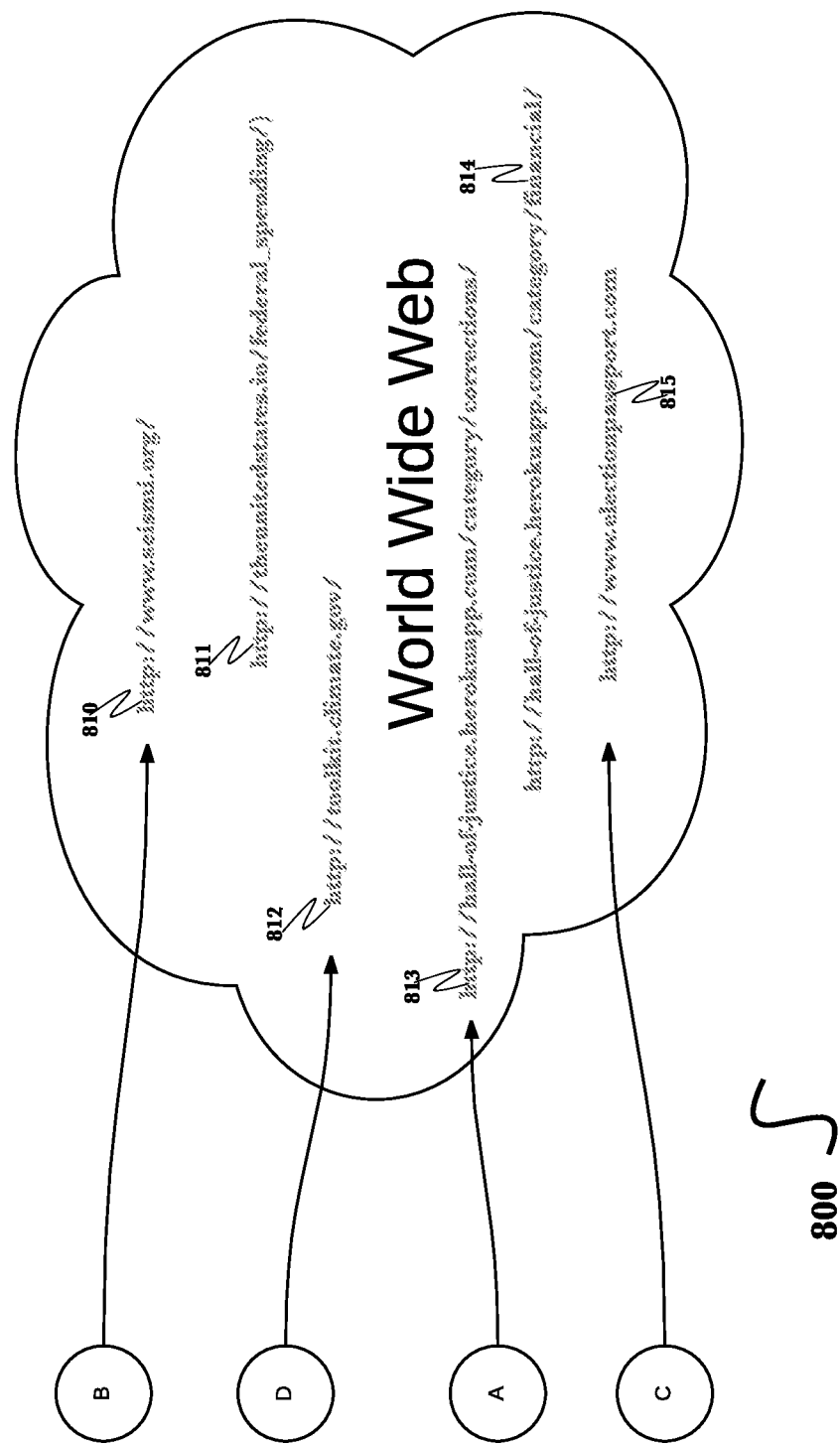
FIG. 8 is a diagram showing exemplary world wide web target sites containing the type of loosely structured, large volume, data that make them candidates for search and retrieval by the invention according to an embodiment of the invention.

FIG. 8 is a block diagram 800 of websites on the world wide web that are example target types of a distributed system for large volume extraction of deep web data. www.seismi.org 810 is a website of geoseismic data which by nature is non-textual and therefore has very few tags that might be useful to conventional web crawlers. Data retrieved from this type of web site also does not fit well into a relational data store setting and might require extensive post-scrape transformation before storage in a document type data store. theunitedstates.io/federal_spending/ 811 is a web site that publishes raw spending data reports with are largely textual, but has extremely few, if any, web related tags and is thus poorly indexed or retrieved by conventional scraping. This type of web site also is expected to have a very large volume of data which again serves to thwart conventional web crawling tools. Further, the raw spending data might require significant pre-processing prior to meaningful data store storage. toolkit.climate.gov 812, like www-.seismi.org 810, is a site that would be expected to have large amounts of non-textual climate data that needs to be processed with few if any web related tags meaning that climate intrinsic keywords would need to be employed for meaningful retrieval of the scraped data and, again both data transformation steps and pre-storage processing may be needed prior to meaningful storage. http://hall-of-justice-.herokuapp.com/category/corrections/ 813, http://hall-of-justice.herokuapp.com/category/financial/ 814, and http://www.electionpassport.com 815 are all similar in that they are sites with extremely large volumes of free form textual data with few if any web tags and high probability that data retrieved will need to be processed prior to output or storage.

Figure 9:
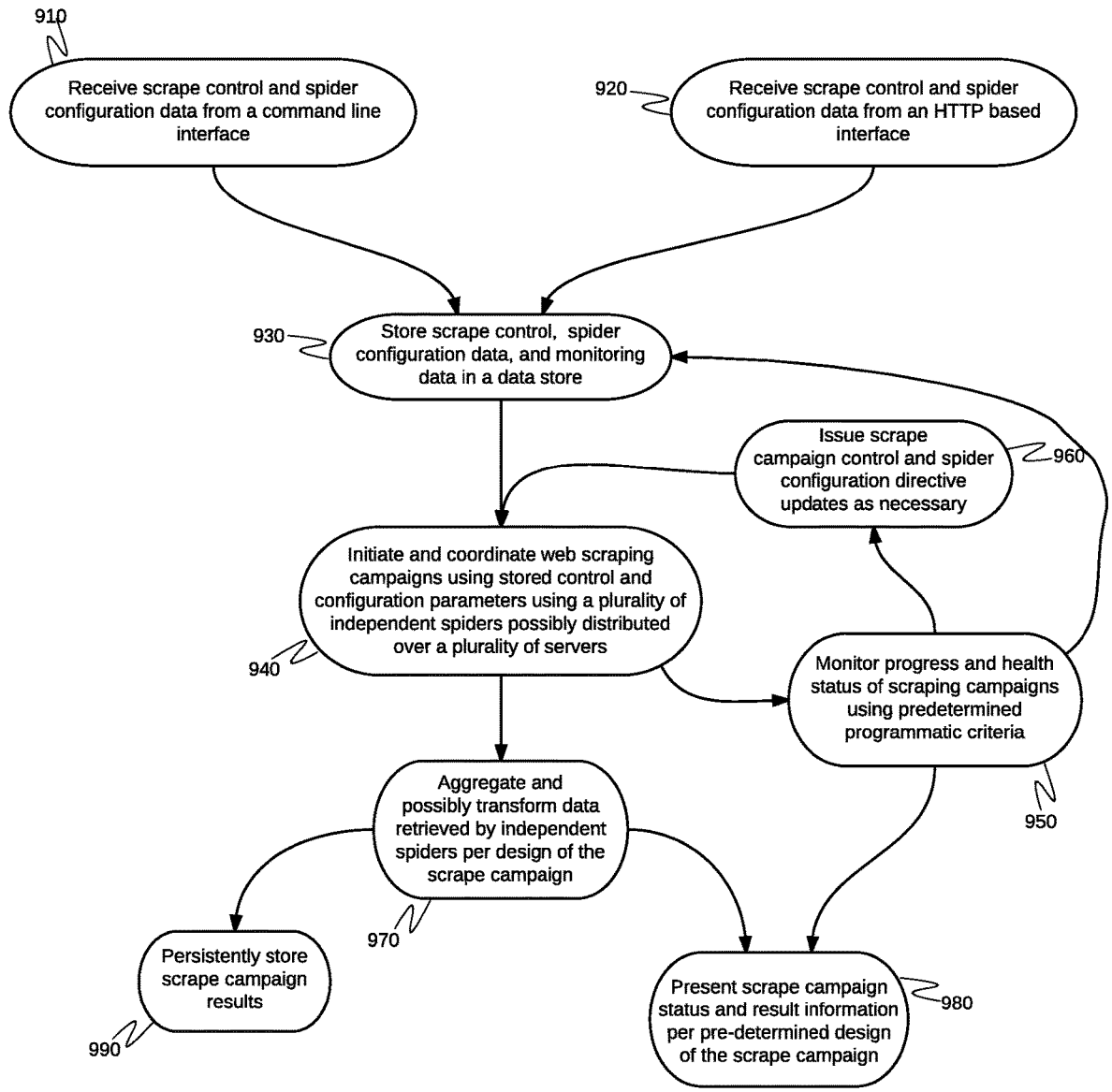
FIG. 9 is a process flow diagram of a method for a high volume web crawling module.

FIG. 9 is a process flow diagram of a method 900 for a high volume web crawling module 115. Parameters for one or more scrape campaigns, configuration data which may be comprised of, but is not limited to: web sites or web pages to be traversed, keywords or tags for web document data to be parsed, and search expansion rules for following links or other references found on the sites scraped, as well as any other spider configuration information included by the authors of the scrape campaign; and scrape campaign control directives which may include but would not be limited to: the number of spiders to be used in the campaign, relative resource usage priorities for specific web sites or pages within the intended scrape campaigns, directives for adjustments to be made to the scrape campaign upon the encounter of specific results or types of results, directives for application of specific scrape campaign result data pre-processing and post-processing steps and output format directives including persistent storage formalization rules; are received through either a command line interface 910 which may receive commands either from an interactive terminal 105 or another software application on a computing system 115 or from software applications 110 through a HTTP based RESTful JSON application programming interface (API) 920. The use of REST and JSON within the API should not be construed to mean that the invention is dependent on use of only those protocols for this task as one knowledgeable in the art will realize that any similar protocols such as, but not limited to, MQTT-based messaging, SOAP or AJAX could be employed. The use of REST and JSON is only in accordance with current practice and inventor decision. Scrape campaign control and spider configuration parameters received are formalized, as necessary and stored in data store for future use when the scrape campaign is initiated. In initiation may be immediate or delayed and the same scrape campaign may be repeatedly run as parameters persist until purged. One knowledgeable in the art will comprehend that key-value data stores such as Redis are very well suited for storage of scrape campaign parameter data, however, the invention does not dictate the use of any specific type of data store for scrape campaign data. Once the command to initiate the scrape campaign is received, the invention uses the control directives passed to it by the scrape campaign authors to coordinate the scrape campaign 940. Directives from a list comprising the number and complexity of the web sites to be scraped, the priorities assigned to specific web sites or pages, the number different spider configurations to be employed, the speed the author desires the scrape to progress among other factors are used to determine the number of spiders that will be deployed and the number of scrape servers to be included in the scrape as per predetermined programming within the invention. While the scrape is active, progress and operational information such as stuck spiders and intermediate scrape results is continuously monitored 950 by the scrape campaign controller module through the scrape controllers 115 such that the authors of the scrape campaign can determine the progress made in the scrape, have some indication of what results have been produced, know what tasks the spiders still have pending as well as any links that may have been followed and the impact on the scrape as a whole of those additions as per pre-programmed reporting parameters 980. Monitoring 950 and reporting 980 aware of operational issues that have arisen, if any. Monitoring data is logged to a data store 930 for future analysis. Program design of the invention allows for adjustments to the scrape campaign be made, either due to the just disclosed progress and operational health reports, or other unforeseen factors, without having to shut down the running scrape and without loss of previously accrued scrape results 960. Raw scrape results obtained by the individual spiders are passed through the scrape controller modules 115 of the scrape servers 115 and are aggregated and then possibly transformed in specific ways depending on the predetermined goals of the scrape campaign 970. The invention offers pre-programmed algorithm toolsets for this purpose and also offers API hooks that allow the data to be passed to external processing algorithms prior to final output in a format pre-decided to be most appropriate for the needs of the scrape campaign authors. Result data may also be appropriately processed and formalized for persistent storage in a document based data store 990 such as MongoDB, although, depending on the needs of the authors and the type of data retrieved during the scrape, any NOSQL type data storage or even a relational database may be used. The invention has no dependency for any particular data store type for persistent storage of scrape results.

Special mention should be made concerning the spiders used in the invention. The authors chose to use Scrapy (Scrapinghub, LTD., www.scrapy.org), a free, open source, BSD licensed, web crawling framework, to generate the spiders employed in web scrapes coordinated by the invention. Scrapy was chosen for several reasons some of which are: The programming, in Python, for the function of a basic web spider is already present and scrape authors therefore do not need extensive programming expertise in designing spiders to use the framework; The format and keywords for the remaining configuration parameters 900 needed to create scrape campaign specific spiders is well defined, feature robust and well documented (http://doc.scrapy.org/en/latest/index.html), and the Scrapy framework has been shown reliable and stable during use by such high data throughput web sites as CareerBuilder.com, BiteFinder.com and Data.gov.uk. While the invention currently makes integral use of the Scrapy framework for the definition of spiders used, it is not programmatically dependent on the Scrapy framework to the point that another web crawling agent framework (e.g. OXPath—http://oxpath.org) could not be substituted if a better alternative were to be found and the use of Scrapy should not be seen to strictly define the invention in that capability.

FIG. 10 is a listing of a very simple example Scrapy web spider configuration file 1000. This listing requires that the Scrapy framework as well as libraries on which Scrapy depends (http://doc.scrapy.org/en/1.0/intro/install.html) are present on the system running the web scrape. While highly simplified, the listing 1000 shows all of the major sections needed to create a scrape specific spider 1010, 1020, 1030, 1040 At the top of the listing 1010 is found a section that declares the portions of the Scrapy framework that is to be included in the creation of the current spider. Going down the listing, the next section 1020 declares a name to be used to identify this spider type as well as the world wide web domains the spider is allowed to traverse during the scrape and last, the url of the starting point of the scrape. In the next section 1030 are any rules to apply when encountering HTML links during a scrape and also what algorithms should be used when processing the target information of the scrape, in this case the spider is scraping specific types of HTML links from the example.com domain. The last section 1040 has the instructions on how to process the target data, including instructions for data associated to specific web tags. While the spider created by this sample configuration would have limited capability, it is functional and would, as written complete its scrape. One will immediately appreciate that all of the directives in the listed spider definition have to do with retrieving the data and not the minutia of how the spider gets to the web site or implements the instructions given in the listed file, etc. This provides the rationale for this framework being used in the invention.

Figure 11:
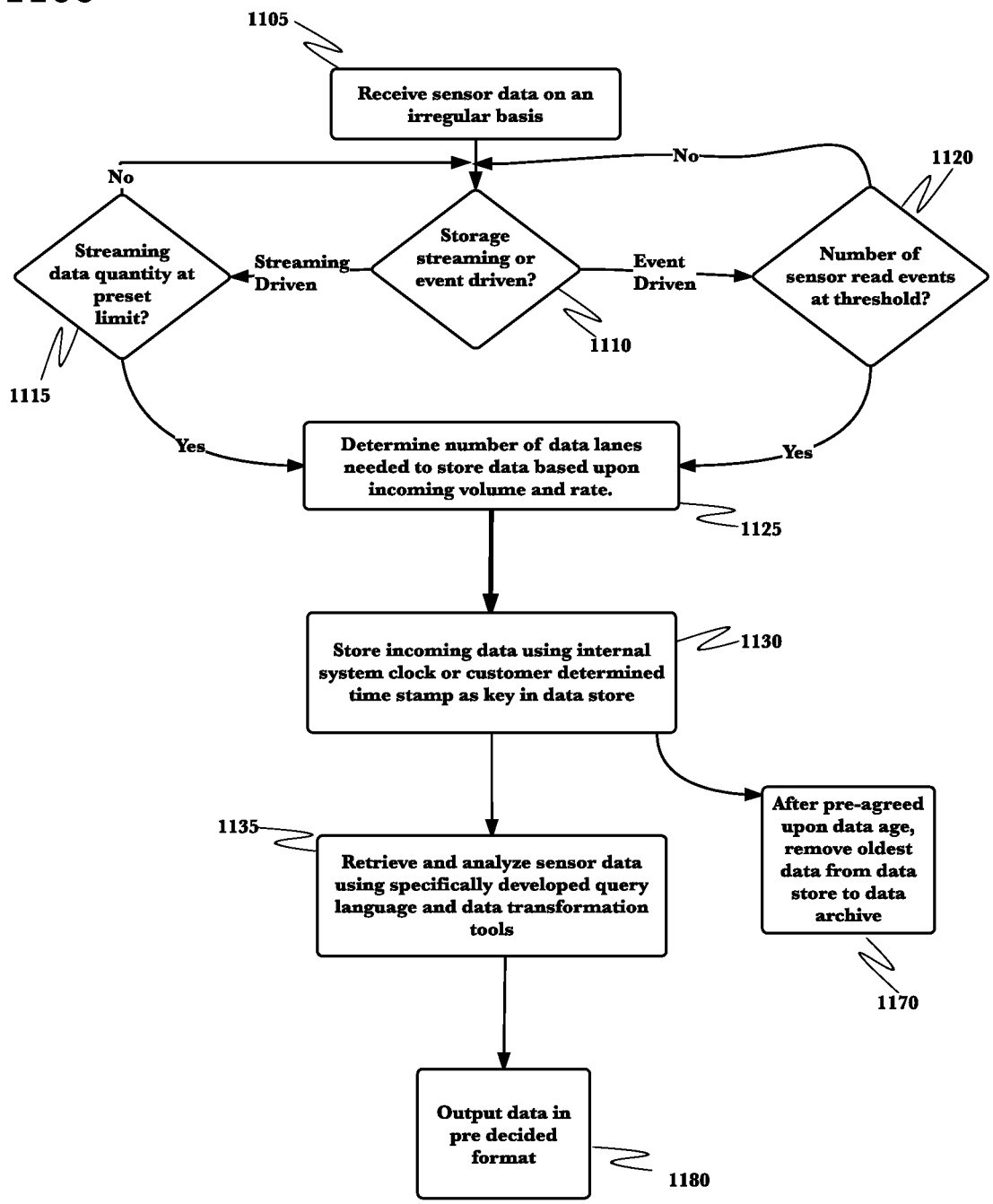
FIG. 11 is a method flow diagram showing an exemplary set of step used in the capture and storage of time series data from sensors with heterogeneous reporting profiles according to an embodiment of the invention.

FIG. 11 is a method flow diagram showing an exemplary method 1100 used in the capture and storage of time series data from sensors with heterogeneous reporting profiles according to an embodiment of the invention. In the first step of the method 1105, data is received from a set of sensors connected to a capture and analysis device as in the embodiment. The sensor data received might be captured and stored under two main paradigms. One is that the sensor data arrives at a defined, reliable periodicity, which may be continuously, but the amount of data per unit time is reliably homogeneous and thus the capture and storage of the sensor data is easy to perform using simple time based models. This paradigm and its resolution is prior art and is not depicted. The second paradigm occurs when the sensors being monitored send data at irregular intervals and the amount of data received by the capture and analysis device can vary greatly overtime. This heterogeneous sensor data behavior demands different processing strategies than does the homogeneous counterpart. Sensor data capture devices that store sensor data at strictly regular time intervals fair badly as the amounts of data per storage cycle can vary greatly. Two strategies that have been found to work reliably in conditions of heterogeneous data influx are event driven and stream capture. The event driven strategy holds data in the memory of a data stream management engine 120 until a preset number of data events have occurred 1110-1120. Data is processed by selecting the parameters, or dimensions within it that are of importance to the administrator and then stored to the data store when a predetermined threshold of events is reached 1120, 1130. The streaming strategy uses the quantity of data accumulated in a data stream management engine 120 as the trigger 1110-1115 to commit the processed sensor data to storage 1115-1130. According to the embodiment, an administrator may preselect either event driven or stream driven commitment, as well as many other parameters pertaining to analysis of sensor data using the administration device 120.

Under conditions of heterogeneous sensor data transmission, there will be times when the rate at which the incoming data to be committed to data store, exceeds the transmission capacity of a single data swimlane 1125. This possibility is accounted for by allowing the system to transparently assign more than one real swimlane to a single data transfer. For example if a single real swimlane can transfer 5 sensors worth of data per unit time and the data from 8 sensors must be committed in that unit time, the system can, if pre-set by the administrator, a metaswimlane, illustrated in FIG. 12 can use real 2 swimlanes, one to transfer 5 sensors worth of data to the data store and the other to transfer three sensors' worth of data to the data store, maintaining the appearance that a single swimlane is in use to the committing process.

All sensor data, regardless of delivery circumstances are stored in a multidimensional time series data store 1130 which is designed for very low overhead, rapid data storage and minimal maintenance needs to sap resources. The embodiment uses a key-value pair data store examples of which are RIAK™, REDIS™, and BERKELEY DB™ for their low overhead and speed although the invention is not specifically tied to a single data store type that is known in the art should another with better response to feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example one group of developers restrict the size of their multidimensional time series key-value pair data store to approximately $8.64 \times 10^4$ records, equivalent to 24 hours of one-second interval sensor readings or 60 days of one-minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 1170. This archival storage as shown provided by data archive 120 might be locally provided by the user, might be cloud based such as that offered by Amazon Web Services or Google or could be any other available very large capacity storage method known to those skilled in the art. Sensor data can be specifically retrieved, using complex query logic 1135 and transformed using such tools as mean reading of all query included sensors, variance of all readings of all sensors queried, standard deviation of queried sensors and more complex types such as standard linear interpolation, Kalman filtering and smoothing, may be applied. Data can then be represented in various formats such as, but not limited to text, JSON, KML, GEOJSON and TOPOJSON by the system depending on the ultimate use of the resultant information 1180.

Figure 12:
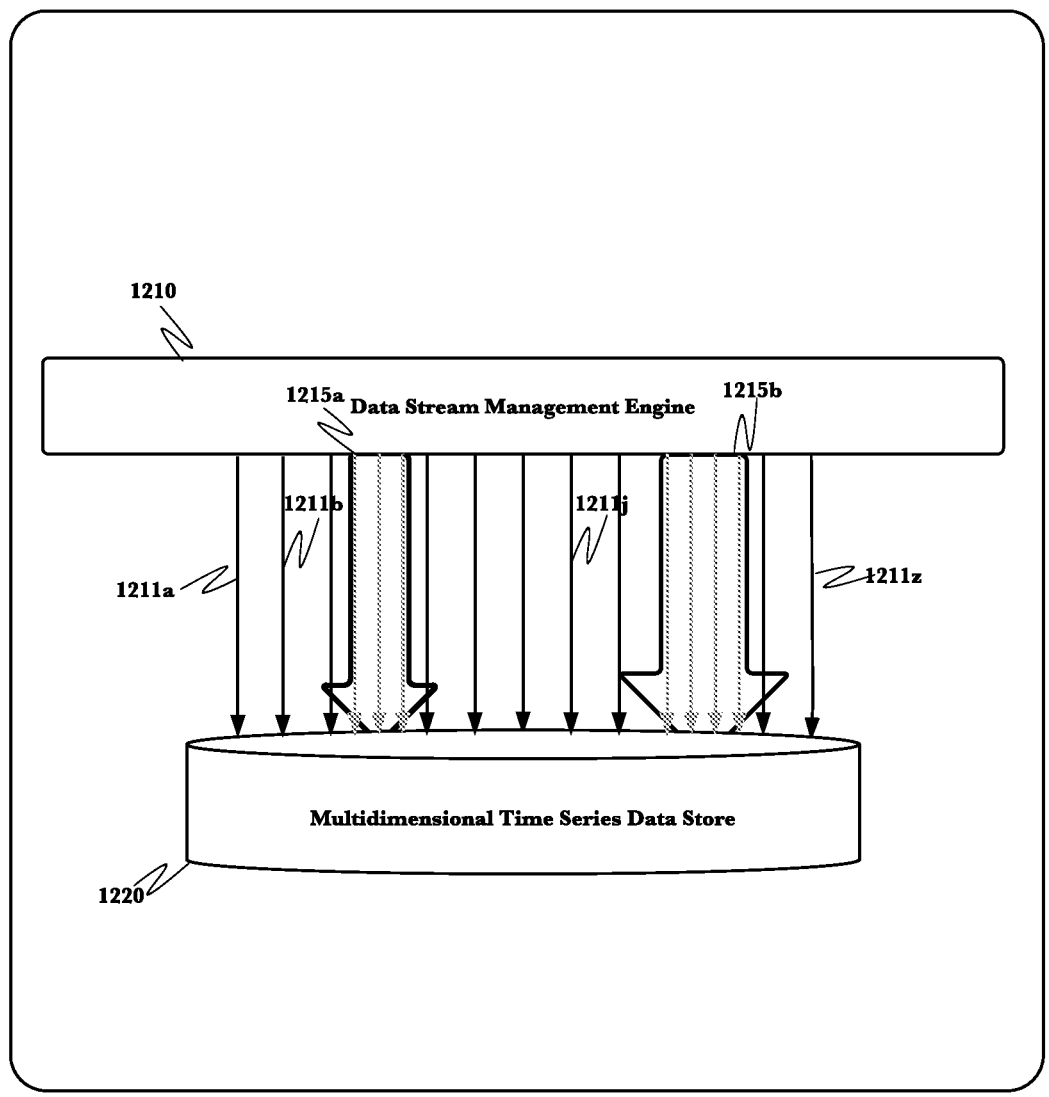
FIG. 12 is a process flow diagram of a method for the use of metaswimlanes to transparently accommodate levels of data streaming which would overload a single swimlane according to an embodiment of the invention.

FIG. 12 is a process flow diagram of a method for the use of metaswimlanes to transparently accommodate levels of data streaming which would overload a single swimlane according to an embodiment of the invention. As previously described, when attempting to commit data from sets of real time sensors that send data at irregular time intervals and probably heterogeneous amounts per unit time, it is likely that situations will arise when the instantaneous influx of data to be transferred from a data stream management engine 1210, also shown in context to an entire embodiment of the invention as 120 to a multidimensional time series data store 1220 shown in context as 120 in a system embodiment of the invention 100, will exceed the instantaneous data capacity of a single data channel, or swimlane 1211*a* between the data stream management engine 1210 and the multidimensional time series data store 1220. Under those conditions, if a remedy could not be brought to bare, important, possibly crucial data could be lost. The remedy taken and shown in this embodiment is the ability of the system to, when configured, combine the transfer and commitment bandwidth of two or more real swimlanes 1215*a*, 1215*b* in a way that is transparent to the committing process. This means that the invention handles the physical transfer pathway as well as the logical details such as tracking the multiple key-value pairs, process identifications and any application specific bookkeeping involved as overhead to the process and then creating a data structure to have the data records act as a single entity in subsequent data manipulations.

Figure 13:
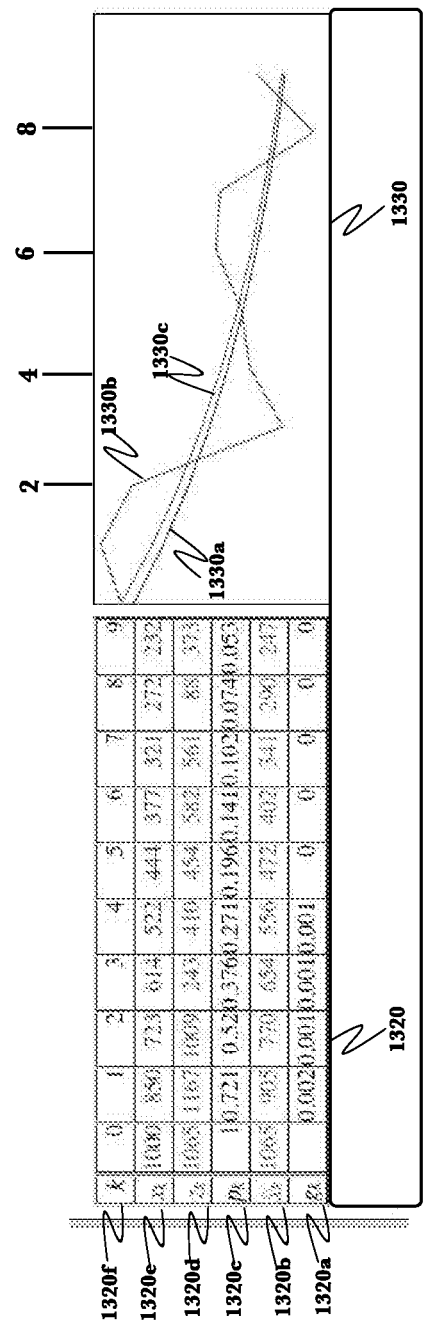
FIG. 13 is a simplified example of the use a Kalman filter to extract and smooth estimated system state from noisy sensor data according to an embodiment of the invention.

FIG. 13 is a simplified example of the use a Kalman filter to extract and smooth estimated system state from noisy sensor data according to an embodiment of the invention. Because of its ability to extract reliably accurate, interpretable data in cases of noisy input data, heavy use is made of Kalman filters in data transformation functions of various embodiments of the invention. It is useful to provide a simple demonstration of how such filters might work in one or more embodiments of the invention. For exemplary purposes, let us imagine that miners in a deep underground mine dig into a large underground repository of carbon dioxide, which rushes into the lowest level of the mine displacing a significant amount of the atmosphere in the mine's lowest level; assume the $CO_2$ level there stabilizes at 50%. The mine company decides to use a combination of lithium hydroxide canisters and the mine shaft's ventilation to handle the problem. A system 120 according to the invention, may be connected to an array of $CO_2$ sensors to monitor the progress of the cleanup. In the example, 50% $CO_2$ registers as 1000 on the $CO_2$ sensors and as a whole the manufacturer states the array will have a noise level of 400. It is believed that the efforts can remove 15.0% of the present $CO_2$ per hour.

Looking at the Kalman filter equations listed in 1310:
a is equal to the percent of CO2 that will be left, compared to the percent in the previous measurement period or 100%−15%=85%. So a=0.85.
$\hat{x}_k$ represents an estimated current result
$\hat{x}_{k-1}$ represents the previous estimated result
r is the publish noise level of the sensor or sensor array
$z_k$ represents the current observed result
$p_k$ is the prediction error between the last previous expected result and the last previous observed result.

Lastly, gk is the factor by which the difference between the last expected result and the current observed result that when added to the last expected result will produce the current expected result.

For each data point plotted in analysis of the sensor data the expected results are calculated using the top equation in 1310 and the error prediction using the second equation. The lower equations are used to update the numbers used to calculate the next set of estimated values $\hat{x}_k$. Looking at 1320, 1320*e* shows calculated $CO_2$ values ($x_k$) determined by multiplying the previous $CO_2$ expected value by the expected reduction of 15% (a) 1330*a*. 1320*d* are the actual values reported by the $CO_2$ sensors 1330*b* at the displayed time points 1320*f*. The Kalman estimated values, starting at the initial reported $CO_2$ sensor value is shown 1320*b*. When graphed, this set of estimated values is depicted in line 1330*c*. The effect of Kalman filter smoothing can be seen by comparing the graphed actual $CO_2$ sensor readings 1330*b* to the graphed Kalman filter data 1330*c*. As the embodiment stores data long term, users of it can also take advantage of a variant of the Kalman filter known as Kalman soothing where data from an another time period is used to better visualize current data. An example would be to use correction data from hours four through eight of the $CO_2$ analysis to smooth hours 12 thorough 14, not depicted.

Figure 18:
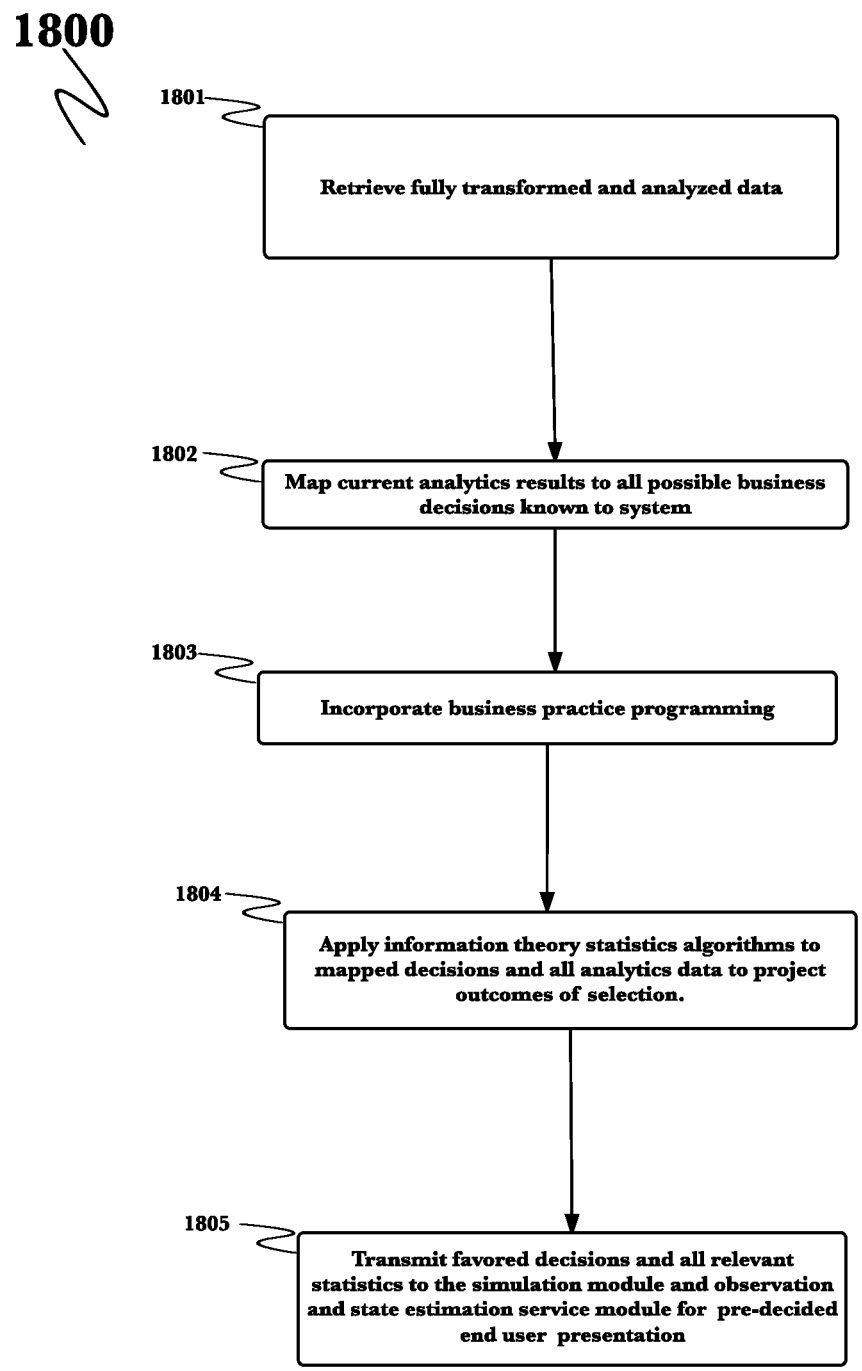
FIG. 18 is a method process flow diagram showing the operation of an automated planning service module according to an embodiment of the invention.

FIG. 18 is a method process flow diagram showing the operation of an automated planning service module according to an embodiment of the invention. The analytics data results from the system are supplied to the automated planning service module 1802 as depicted in 130. Within the module the analytic data results are mapped to all possible business actions or decisions which are suggested by the broad findings and known within the system. Many of these actions may have been entered specifically for the current campaign 1802. Any external source information such as existing business practices that impact the decision, legal and regulatory considerations that impact the proposed action among an additional plurality of possible factors known to the art, are then incorporated into the action selection process 1803. Once the broadest set of possible prospective actions accounting for external parameters is known, information theory statistics algorithms and machine learning principles are employed on the analytic data developed by the system 100 to reliably predict the probable outcomes of pursuing each choice and provide statistical data associated with each action 1804. The data pertaining to actions with a favorable outcome value above a predetermined threshold are sent to the simulation module 125 and the observation and state estimation 140 modules for appropriate presentation to end users as dictated by the authors of the related analytical campaign 1805.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 14:
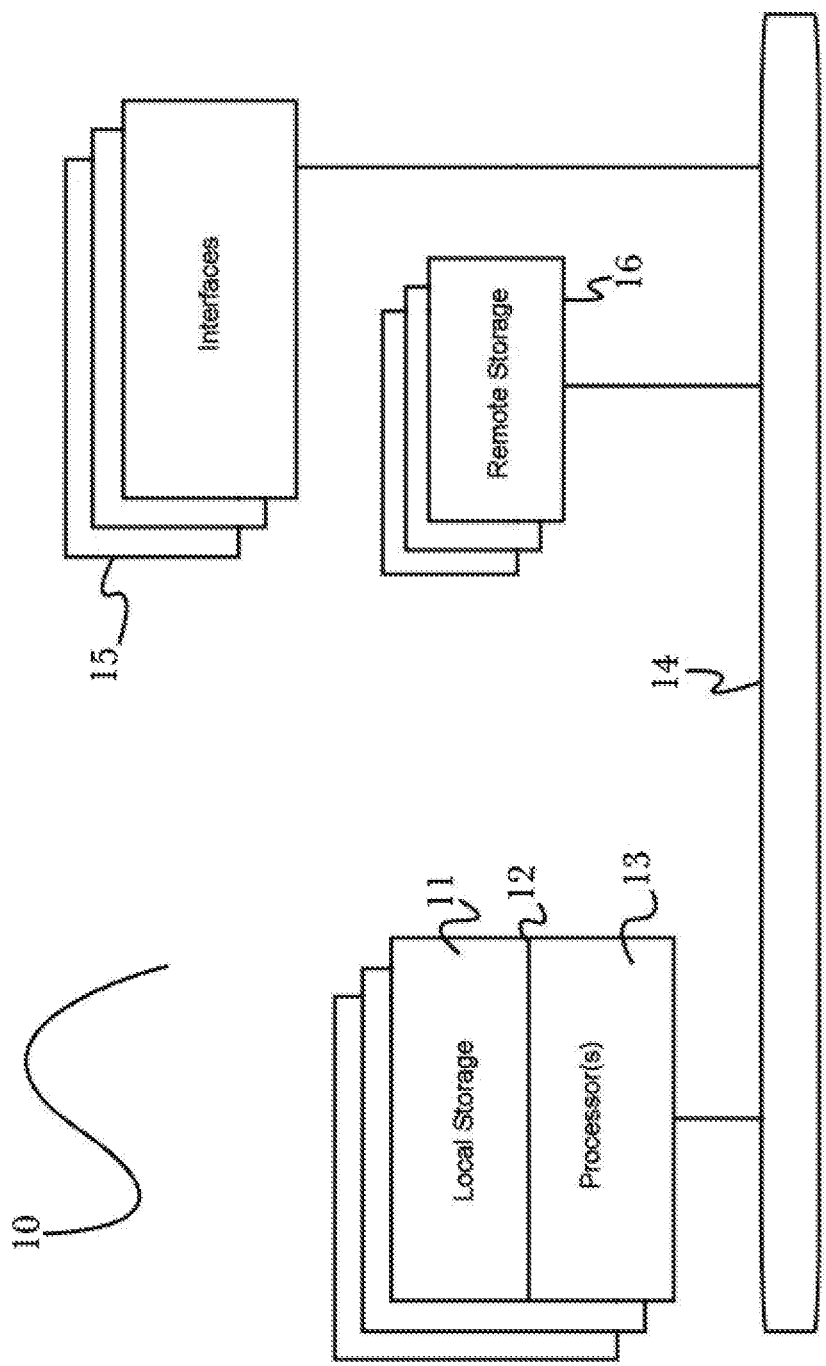
FIG. 14 is a block diagram illustrating an exemplary hardware architecture of a computing device used in various embodiments of the invention.

Referring now to FIG. 14, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 15:
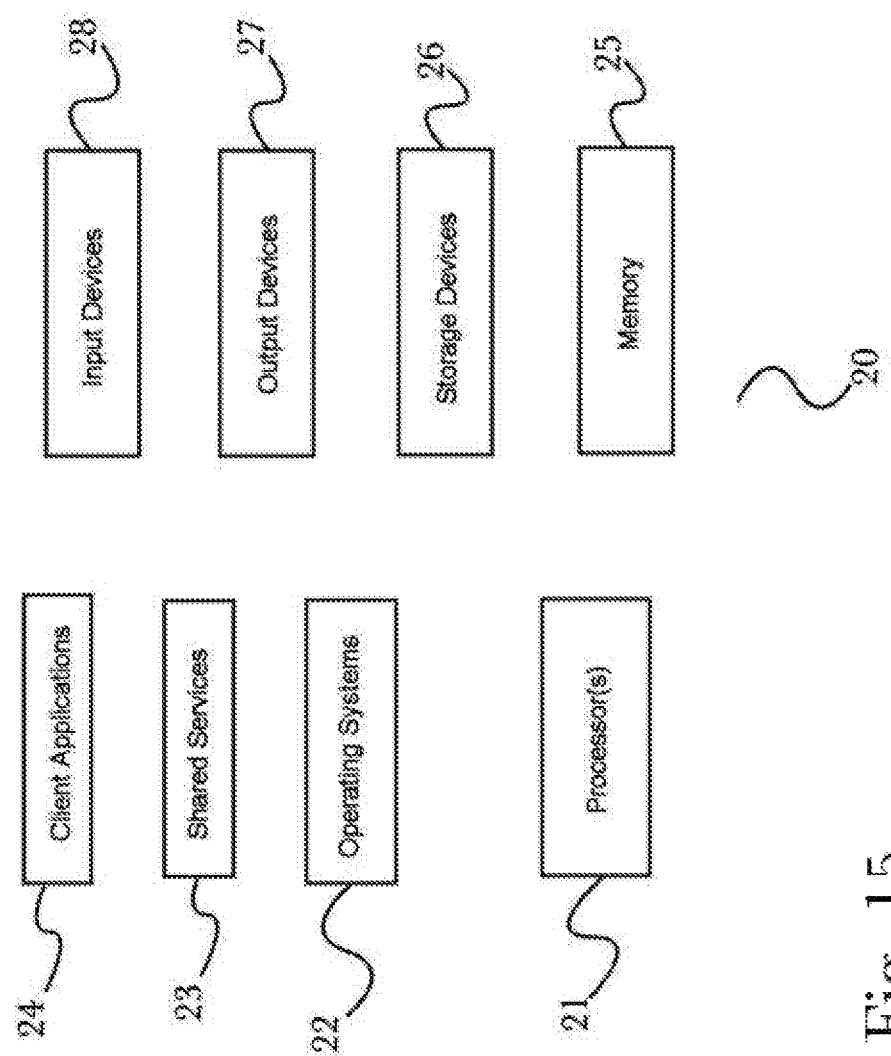
FIG. 15 is a block diagram illustrating an exemplary logical architecture for a client device, according to various embodiments of the invention.

In some embodiments, systems according to the present invention may be implemented on a standalone computing system. Referring now to FIG. 15, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 16:
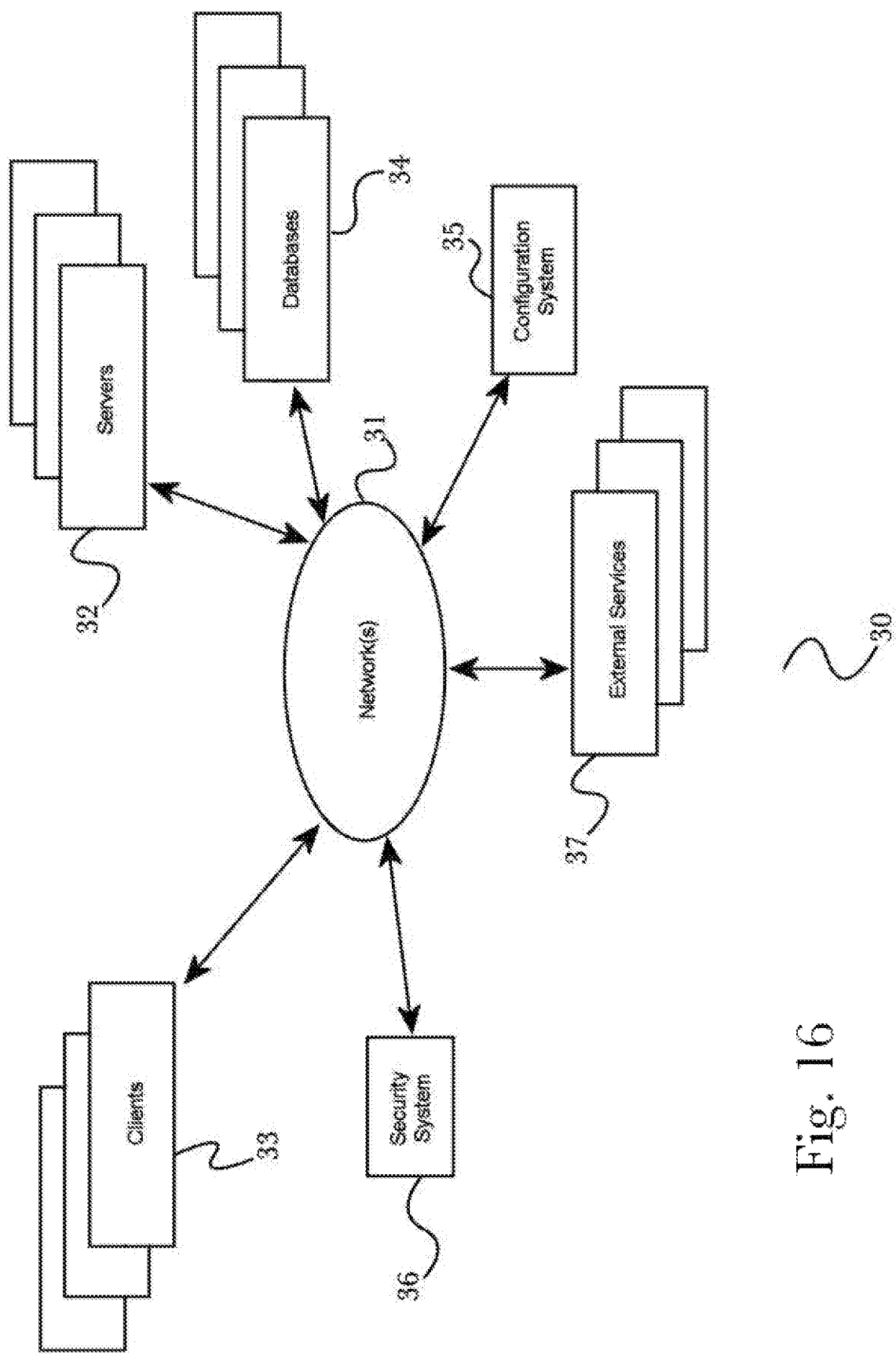
FIG. 16 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 16, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 17:
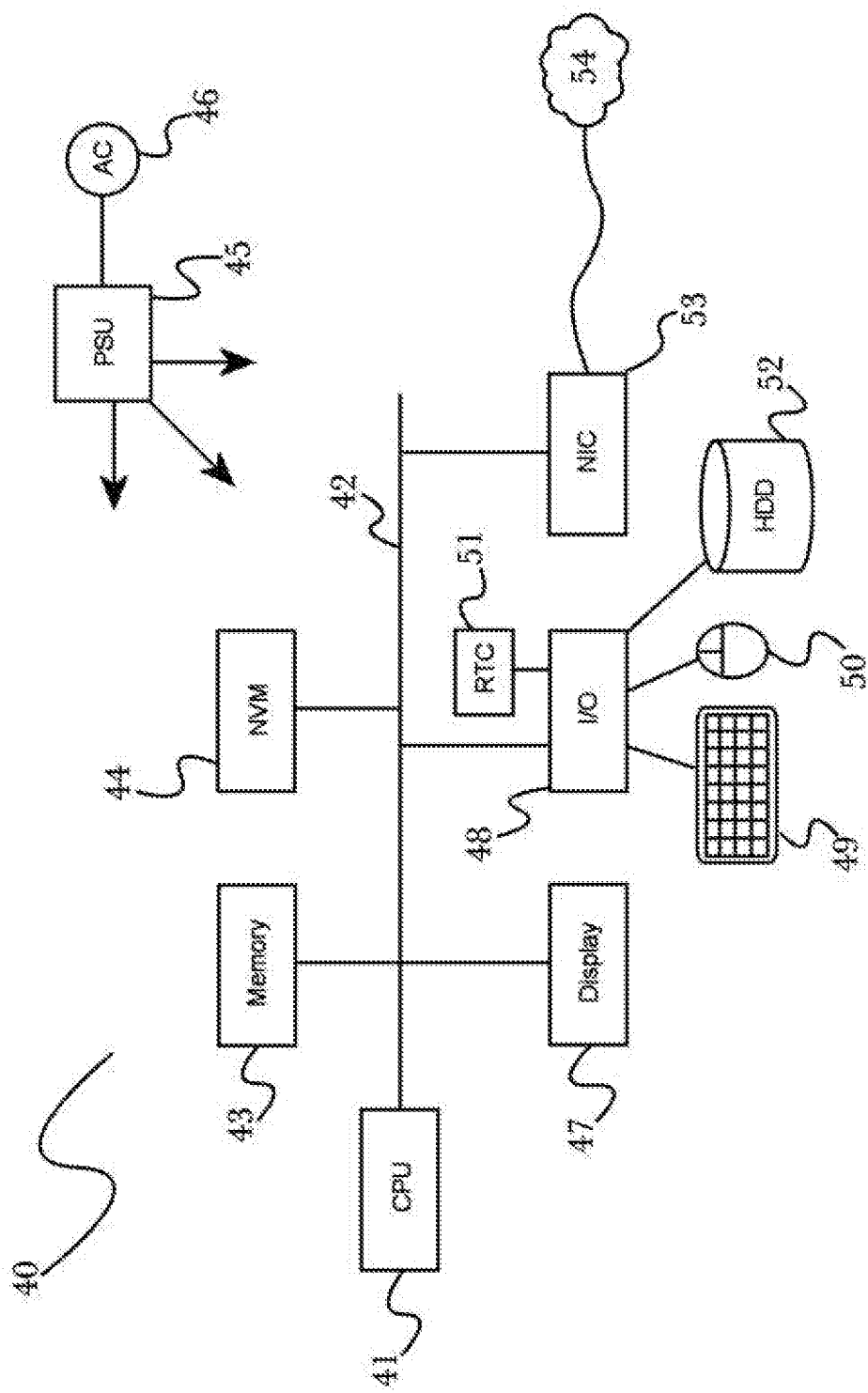
FIG. 17 is another block diagram illustrating an exemplary hardware architecture of a computing device used in various embodiments of the invention

FIG. 17 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client The skilled person will be aware of a range of possible modifications of the various embodiments described above. Accordingly, the present invention is defined by the claims and their equivalents.

What is claimed is:

1. A system for automated business decision optimization, comprising:
    a network-connected computing device comprising a memory and a processor;
    a high volume deep web scraper comprising first plurality of programming instructions stored in the memory of, and operating on the processor of, the computing device, wherein the first plurality of programming instructions, when operating on the processor, cause the network-connected computing device to perform deep web searches by extracting information from data stores located on the Internet that are not accessible by conventional web crawlers;
    a business data retrieval engine comprising second plurality of programming instructions_stored in the memory of, and operating on the processor of, the network-connected computing device, wherein the second plurality of programming instructions, when operating on the processor, cause the network-connected computing device to:
    receive a business analysis campaign configuration comprising analysis parameters for optimizing a business decision;
    retrieve a plurality of business operations data from devices within a business computer network related to the business analysis campaign configuration;
    direct the high volume deep web scraper to retrieve a plurality of supplemental data from deep web extraction related to the business analysis campaign configuration;
    a directed computational graph module comprising a third plurality of programming instructions stored in the memory of, and operating on the processor of, the network-connected computing device, wherein the third plurality of programming instructions, when operating on the processor, cause the network-connected computing device to:
    construct a directed computational graph from the business analysis campaign configuration, wherein:
    the directed computational graph comprises nodes representing data transformations and edges representing messages between the nodes; and
    the nodes and edges of the directed computational graph represent data processing pipelines for analyzing the business analysis campaign configuration; and
    a business decision and business action path simulation engine comprising a fourth plurality of programming instructions stored in the memory of, and operating on the processor of, the network-connected computing device, wherein the fourth plurality of programming instructions, when operating on the processor, cause the network-connected computing device to:
    determine a set of possible prospective actions from the business analysis campaign configuration, the business operations data, and the supplemental data;
    simulate the outcome of each prospective action using the data processing pipelines of the directed computing graph as a simulation model;
    determine an optimal outcome from the parametric analysis by matching the outcome of each prospective action against the analysis parameters; and recommend the prospective action with the optimal outcome as the business decision.

2. The system of claim 1, wherein the business information retrieval engine employs a portal for human interface device to input the current business analysis campaign configuration.

3. The system of claim 2, wherein high volume deep web scraper receives at least some scrape control and spider configuration parameters from a customizable cloud-based interface, coordinates one or more world wide web searches (scrapes) using both general search control parameters and individual web search agent (spider) specific configuration data, receives scrape progress feedback information which may lead to issuance of further scrape control and spider configuration parameters, controls and monitors the spiders on distributed scrape servers, receives raw scrape campaign data from scrape servers, aggregates at least portions of scrape campaign data from each web site or web page traversed as per the parameters of the scrape campaign data.

4. The system of claim 3, wherein the scrape control and spider configuration parameters are provided by a library of spider templates and individual spiders are created using the spider templates.

5. The system of claim 3, wherein one or more of the business analysis campaign configurations is persistently stored and can be reused or used as basis for similar business analysis campaigns.

6. The system of claim 1, wherein the business information retrieval engine employs a multidimensional time series data store comprising a fifth plurality of programming instructions stored in the memory of, and operating on the processor of, the computing device, wherein the fifth plurality of programming instructions, when operating on the processor, cause the network-connected computing device to receive a plurality of data from a plurality of sensors of heterogeneous types, some of which may have heterogeneous reporting and data payload transmission profiles, aggregates the sensor data over a predetermined amount of time, a predetermined quantity of data, or a predetermined number of events, retrieves a specific quantity of aggregated sensor data per each access connection predetermined to allow reliable receipt and inclusion of the data, transparently retrieves quantities of aggregated sensor data too large to be reliably transferred by one access connection using a further plurality access connections to allow capture of all aggregated sensor data under conditions of heavy sensor data influx and stores aggregated sensor data in a simple key-value pair with very little or no data transformation from how the aggregated sensor data is received.

7. The system of claim 1, wherein the directed computational graph module:
retrieves streams of input from one or more of a plurality of data sources;
filters data to remove data records from each stream based on one or more of the following:
absence of all information, damage to data in the record, and presence of in-congruent information or missing information which invalidates the data record;
splits filtered data stream into two or more identical streams;
formats data within one data stream based upon a set of predetermined parameters; and
sends identical data stream for further analysis and either linear transformation or branching transformation using resources of the system.

8. A method for automated business decision optimization, comprising the steps of:
receiving a business analysis campaign configuration comprising analysis parameters for optimizing a business decision;
retrieving a plurality of business operations data from devices within a business computer network related to the business analysis campaign configuration;
directing a high volume web crawler to retrieve a plurality of supplemental data from deep web extraction related to the business analysis campaign configuration by extracting information from data stores located on the Internet that are not accessible by conventional web crawlers;
constructing a directed computational graph from the business analysis campaign configuration, wherein:
the directed computational graph comprises nodes representing data transformations and edges representing messages between the nodes; and
the nodes and edges of the directed computational graph represent data processing pipelines for analyzing the business analysis campaign configuration;
determining a set of possible prospective actions from the business analysis campaign configuration, the business operations data, and the supplemental data;
simulating the outcome of each prospective action using the data processing pipelines of the directed computing graph as a simulation model;
determining an optimal outcome from the parametric analysis by matching the outcome of each prospective action against the analysis parameters; and
recommending the prospective action with the optimal outcome as the business decision.

9. The method of claim 8, wherein a portal for human interface device is used to input the business analysis campaign configuration.

10. The method of claim 9, wherein the high volume deep web scraper receives at least some scrape control and spider configuration parameters from a customizable cloud-based interface, coordinates one or more world wide web searches (scrapes) using both general search control parameters and individual web search agent (spider) specific configuration data, receives scrape progress feedback information which may lead to issuance of further scrape control and spider configuration parameters, controls and monitors the spiders on distributed scrape servers, and receives raw scrape campaign data from scrape servers, aggregates at least portions of scrape campaign data from each web site or web page traversed as per the parameters of the scrape campaign data.

11. The method of claim 10, wherein the scrape control and spider configuration parameters are provided by a library of spider templates and individual spiders are created using the spider templates.

12. The method of claim, 10 wherein one or more of the business analysis campaign configurations is persistently stored and can be reused or used as basis for similar business analysis campaigns.

13. The method of claim 9, wherein the a multidimensional time series data is used to receive a plurality of data from a plurality of sensors of heterogeneous types, some of which may have heterogeneous reporting and data payload transmission profiles, aggregates the sensor data over a predetermined amount of time, a predetermined quantity of data or a predetermined number of events, retrieves a specific quantity of aggregated sensor data per each access connection predetermined to allow reliable receipt and inclusion of the data, transparently retrieves quantities of aggregated sensor data too large to be reliably transferred by one access connection using a further plurality access connections to allow capture of all aggregated sensor data under conditions of heavy sensor data influx and stores aggregated sensor data in a simple key-value pair with very little or no data transformation from how the aggregated sensor data is received.

14. The method of claim 8, wherein the directed computational graph module:
retrieves streams of input from one or more of a plurality of data sources;
filters data to remove data records from the stream based on one or more of the following:
absence of all information, damage to data in the record, and presence of in-congruent information or missing information which invalidates the data record;
splits filtered data stream into two or more identical streams, formats data within one data stream based upon a set of predetermined parameters so as to prepare for meaningful storage in a data store; and
sends identical data stream for further analysis and either linear transformation or branching transformation using resources of the system.

\* \* \* \* \*